(12) United States Patent
Yang

(10) Patent No.: US 7,593,529 B1
(45) Date of Patent: Sep. 22, 2009

(54) SCRAMBLE METHODS AND APPARATUS FOR PACKETIZED DIGITAL VIDEO SIGNAL IN CONDITIONAL ACCESS SYSTEM

(75) Inventor: Xiaowen Yang, Shanghai (CN)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/492,454

(22) Filed: Jan. 27, 2000

(51) Int. Cl.
H04N 7/167 (2006.01)
H04K 1/00 (2006.01)
H04L 9/28 (2006.01)
H04L 29/06 (2006.01)
H04L 9/32 (2006.01)
G06F 12/14 (2006.01)

(52) U.S. Cl. .................. 380/200; 380/239; 380/217; 380/255; 380/28; 713/151; 713/165; 713/168; 713/189; 713/160; 705/50

(58) Field of Classification Search ............ 380/200, 380/210, 216, 217; 713/150, 160
See application file for complete search history.

(56) References Cited

U.S. PATENT DOCUMENTS

| | | | | |
|---|---|---|---|---|
| 5,590,202 A * | 12/1996 | Bestler et al. | ........... | 380/212 |
| 5,682,426 A * | 10/1997 | Miliani et al. | ........... | 380/206 |
| 5,805,700 A * | 9/1998 | Nardone et al. | ........... | 380/217 |
| 5,818,935 A * | 10/1998 | Maa | ........... | 380/200 |
| 5,937,067 A * | 8/1999 | Thatcher et al. | ........... | 380/212 |
| 5,956,405 A * | 9/1999 | Yuval | ........... | 380/29 |
| 5,959,659 A * | 9/1999 | Dokic | ........... | 725/152 |
| 6,021,199 A * | 2/2000 | Ishibashi | ........... | 380/217 |
| 6,118,819 A * | 9/2000 | Kim | ........... | 375/240 |
| 6,223,285 B1 * | 4/2001 | Komuro et al. | ........... | 713/160 |
| 6,246,767 B1 * | 6/2001 | Akins et al. | ........... | 380/210 |
| 6,275,588 B1 * | 8/2001 | Videcrantz et al. | ........... | 380/255 |
| 6,400,996 B1 * | 6/2002 | Hoffberg et al. | ........... | 700/83 |
| 6,415,031 B1 * | 7/2002 | Colligan et al. | ........... | 380/200 |
| 6,418,424 B1 * | 7/2002 | Hoffberg et al. | ........... | 706/21 |
| 6,526,144 B2 * | 2/2003 | Markandey et al. | ........... | 380/28 |
| 6,640,145 B2 * | 10/2003 | Hoffberg et al. | ........... | 700/83 |
| 6,668,324 B1 * | 12/2003 | Mangold et al. | ........... | 713/189 |

(Continued)

OTHER PUBLICATIONS

Newton, Harry, Newton's Telecom Dictionary, 1998, Telecom Books, 14th Updated and Expanded Edition, pp. 489-490.*

(Continued)

Primary Examiner—Christopher A Revak
Assistant Examiner—Aravind K Moorthy
(74) Attorney, Agent, or Firm—Mendelsohn, Drucker & Associates, P.C.; Yuri Gruzdkov; Steve Mendelsohn

(57) ABSTRACT

A conditional access scrambling or encryption technique for a packetized digital data stream, e.g., a MPEG-2 bitstream, (1) by scrambling or encrypting the data payload of selective transport payload packets (e.g., every nth packet); (2) by scrambling or encrypting only a portion (e.g., a central portion) of the data payload of every transport payload packets; or (3) by both scrambling or encrypting the data payload of every nth packet and scrambling or encrypting only a portion of the data payload of every transport payload packet. With advance knowledge by the subscriber's descrambler of which payload packets are being scrambled, and/or of which portion of which payload packets, descrambling can be performed with minimal processing and without the need to first recreate the underlying image and/or audio.

27 Claims, 4 Drawing Sheets

U.S. PATENT DOCUMENTS

| | | | |
|---|---|---|---|
| 6,738,983 B1 * | 5/2004 | Rao et al. | 725/120 |
| 6,754,347 B1 * | 6/2004 | Hamada | 380/216 |
| 6,771,657 B1 * | 8/2004 | Elstermann | 370/465 |
| 6,850,252 B1 * | 2/2005 | Hoffberg | 715/716 |
| 7,024,557 B1 * | 4/2006 | Moles et al. | 713/170 |
| 7,082,198 B1 * | 7/2006 | Ishii | 380/239 |
| 7,085,377 B1 * | 8/2006 | Norr | 380/37 |
| 7,120,249 B2 * | 10/2006 | Roberts | 380/44 |
| 7,151,832 B1 * | 12/2006 | Fetkovich et al. | 380/210 |
| 7,194,091 B2 * | 3/2007 | Higashi et al. | 380/202 |
| 7,376,831 B2 * | 5/2008 | Kollmyer et al. | 713/154 |
| 2007/0180227 A1 * | 8/2007 | Akimoto | 713/153 |
| 2007/0189525 A1 * | 8/2007 | Wajs | 380/42 |
| 2008/0028210 A1 * | 1/2008 | Asano | 713/161 |
| 2008/0184276 A1 * | 7/2008 | Jong | 719/321 |

OTHER PUBLICATIONS

Anonymous, Lucent Technologies: Lucent Digital Video introduces new line of MPEG-2 encoders, Lucent VideoStar, 1999, M2 Presswire, pp. 1-3.*

Tosun et al, Efficient Multi-layer Coding and Encryption of MPEG Video Streams, 2000, IEEE, pp. 119-122.*

Wee et al, Secure Scalable Streaming Enabling Transcoding without Decryption, 2001, IEEE, pp. 437-440.*

Newton, Harry, Newton's Telecom Dictionary, 1998, Telecom books, pp. 489-490.*

* cited by examiner

PARTIALLY SCRAMBLE OR ENCRYPT THE PAYLOAD

SCRAMBLE METHODS AND APPARATUS FOR PACKETIZED DIGITAL VIDEO SIGNAL IN CONDITIONAL ACCESS SYSTEM

BACKGROUND OF THE INVENTION

1. Field of the Invention

This invention relates generally to the provision of subscription broadcast services. More particularly, it relates to a scrambling technique for a digital MPEG-2 data stream intended for proper reception by subscribers and scrambling for non-subscribers.

2. Background of Related Art

Subscription broadcast services for video and/or audio can be thought of as conditional access (CA) systems. In a conditional access system, a broadcast signal is actively scrambled for broadcast such that only authorized receivers can access the payload, e.g., video, audio and/or data, by descrambling the received scrambled signal.

An example conditional access system is a pay cable television channel, which is conditioned for proper reception by any particular user upon payment (i.e., subscription). Subscribers are permitted to descramble the received broadcast signal, while non-subscribers leave the signal scrambled.

Many scrambling techniques exist in conventional analog conditional access systems. For instance, an analog signal (e.g., analog video or analog audio) may be scrambled using: (1) a trap; (2) a reverse trap; (3) hidden channels; (4) sync attenuation or suppression; (5) variable delay line; (6) active line inversion; (7) active cut line rotation; (8) active line shuffle; or (9) reverse active line scan. Each of these conventional scrambling techniques are explained in a little more detail.

(1) Traps

A trap is a sharply tuned notch filter inserted in a subscriber's receive path at the point where the customer's service drop is taken from the network.

(2) Reverse Traps

A reverse trap is an extra radio-frequency 'spoiler' signal inserted into that part of the frequency spectrum between the high frequency edge of the vision signal and the sound carrier.

(3) Hidden Channels

A hidden channel uses a frequency channel over a cable which is not permitted for over-air broadcast use.

(4) Sync Attenuation or Suppression

Sync attenuation or suppression reduces the sync pulse amplitude of the radio-frequency signal by attenuation at the head end.

(5) Variable Line Delay

A variable delay device inserted in a receive path introduces various delays into some of the lines of the television picture video signal on a pseudo-random basis.

(6) Active Line Inversion

Active line inversion inverts the signal on the active line (7) Active Cut Line Rotation Active cut line rotation (or active component rotation) relates to cutting the components on each line of the picture into two parts. The cut points are determined as part of a given encryption mechanism using a pseudo-ransom number generator. Each of the two parts is then interchanged (effectively rotated about the cut point) so that the line can be scrambled before transmission.

(8) Active Line Shuffle

Using active line shuffle, the line order of a video image in a line memory block is re-ordered so that errors will occur in the vertical direction. This is also called "Vertical scrambling". To implement active line shuffle, a sufficient and significant amount of memory must be available in the line memory block of both the scrambler and the descrambler.

(9) Reverse Active Line Scan

Reverse active line scan is performed by scanning the line from line end to line start, rather than in normal order from line start to line end. A pseudo-random sequence generator is used to assign the line for reversing the scan. Reverse active line scanning requires a one-line memory in both the scrambler and in each descrambler to store the active line for reverse scanning.

These scrambling techniques work adequately for analog broadcast systems by impairing the receive quality of a conditional access analog broadcast signal, but are not all applicable for use in the emerging digital broadcasts in conditional access systems.

For instance, MPEG-2 is an emerging digital compression standard which is gaining in popularity. MPEG-2 is a compression standard which allows the coding of studio quality video for digital TV, high-density CD-ROMs and TV-broadcasting. Generally, the signal exists in the Europe DVB (Digital Video Broadcast) system, US HDTV system, and other related fields. The present invention relates to the conditional access to a digital compressed MPEG-2 bitstream allowing only subscribers to properly receive the MPEG-2 bitstream, and presenting a scrambled signal to non-subscribers.

FIG. 5 shows a digital stream of MPEG-2 transport packets 520.

In particular, in FIG. 5, the MPEG-2 transport packets 520 each contain a header portion 501, 503, 505, 507, 509, and a payload portion 502, 504, 506, 508, 510 containing the underlying program data. According to MPEG-2, the MPEG-2 transport packets 520 are 188 bytes in length.

Using a MPEG-2 bitstream as defined in the appropriate standard (e.g., ISO/IEC 13818-1), no scrambling is allowed to be applied to the header portion 501, 503, 505, 507, 509 of any of the transport packets 520. Moreover, according to the relevant standards, the length of the MEPG-2 transport packets must remain the same, i.e., 188 bytes.

These and other requirements limit the possible conventional scrambling techniques to, e.g., either (6) active line inversion, (7) active cut line rotation, (8) active line shuffle, or (9) reverse active line scan techniques, as described above.

Unfortunately, conventional scrambling techniques such as (6) to (9) described above require a significant amount of system resources. For instance, to invert an active line, perform active cut line rotation, or active line shuffling, the received image must first be unscrambled and/or unencrypted, and decompressed, before the image lines can be manipulated for scrambling purposes. This extra processing counteracts the efficiency of compressed digital transmissions, e.g., MPEG-2 compression, and generally wasting system resources. Moreover, no conventional scrambling technique makes use of the properties of a compressed digital signal, again wasting system resources.

There is a need for a technique and apparatus for efficiently scrambling a compressed digital data stream (e.g., MPEG-2) with appreciation of the compressed nature of the digital data stream and requiring minimal excess processing.

SUMMARY OF THE INVENTION

In accordance with the principles of the present invention, a device to descramble a packetized digital data stream comprises a receiver to receive a packet of a scrambled packetized digital data stream. The packet includes a header portion and a data payload. The data payload includes a scrambled portion and a clear, unscrambled portion. A descrambler descrambles the scrambled portion of the data payload of the packet while leaving the clear, unscrambled portion unaffected.

A method of scrambling a packetized digital data stream in accordance with another aspect of the present invention comprises producing a data packet stream comprising a plurality of data packets. A first portion of a data payload of at least some of the plurality of data packets within the data packet stream are scrambled without scrambling a header of the at least some of the plurality of data packets.

A method of scrambling a packetized digital data stream in accordance with yet another aspect of the present invention comprises producing a data packet stream comprising a plurality of data packets. Every nth one of the plurality of data packets is scrambled, where n is an integer greater than 1, leaving remaining ones of the plurality of data packets unscrambled.

A method of descrambling a packetized digital data stream in accordance with still another aspect of the present invention comprises receiving a data packet stream comprising a plurality of data packets. Every nth one of the plurality of data packets is descrambled, where n is an integer greater than 1, leaving remaining ones of the plurality of data packets as received.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention relates a conditional access scrambling or encryption technique for a packetized digital data stream, e.g., a MPEG-2 bitstream, (1) by scrambling or encrypting the data payload of selective transport payload packets (e.g., every nth packet); (2) by scrambling or encrypting only a portion (e.g., a central portion) of the data payload of every transport payload packets; or (3) by both scrambling or encrypting the data payload of every nth packet and scrambling or encrypting only a portion of the data payload of every transport payload packet.

With advance knowledge by the subscriber's descrambler of which payload packets are being scrambled, and/or of which portion of which payload packets, descrambling can be performed with minimal processing and without the need to first recreate the underlying image and/or audio.

Figure 1:
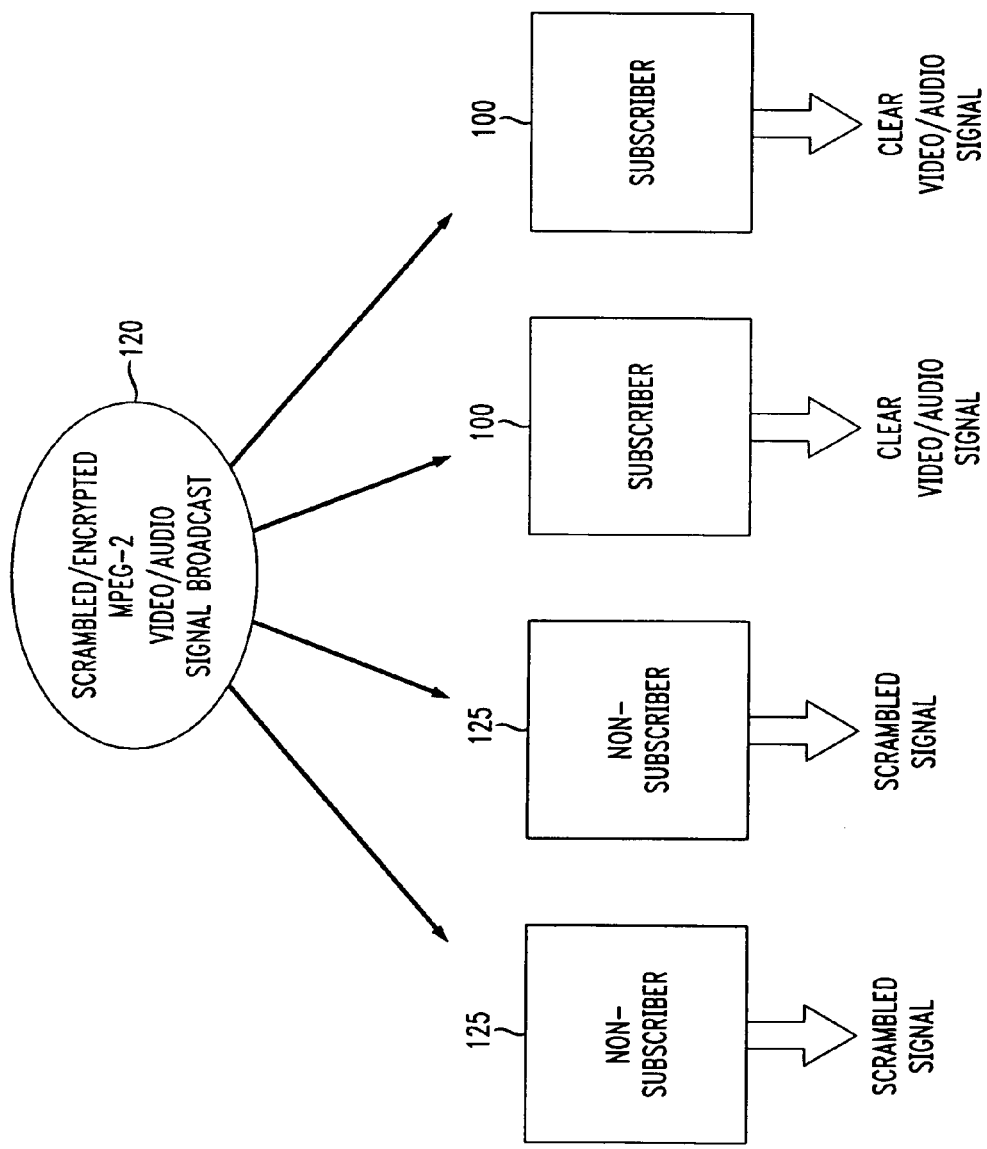
FIG. 1 shows a conditional access system including a broadcast scrambled or encrypted packetized data stream, e.g., an MPEG-2 video/audio bitstream.

FIG. 1 shows a conditional access system including a broadcast scrambled or encrypted packetized data stream, e.g., an MPEG-2 video/audio bitstream 120.

In particular, in FIG. 1, the scrambled MPEG-2 bitstream can be broadcast or transmitted using any applicable technique, e.g., from a headend of a cable system, or from an RF transmitter of a wireless system.

The conditional access system includes one or more non-subscribers 125 as well as one or more subscribers 100. The subscriber's receiving equipment 100 includes a descrambler to descramble the scrambled/encrypted MPEG-2 digital video/audio bitstream 120 transmitted or broadcast system wide.

Figure 2:
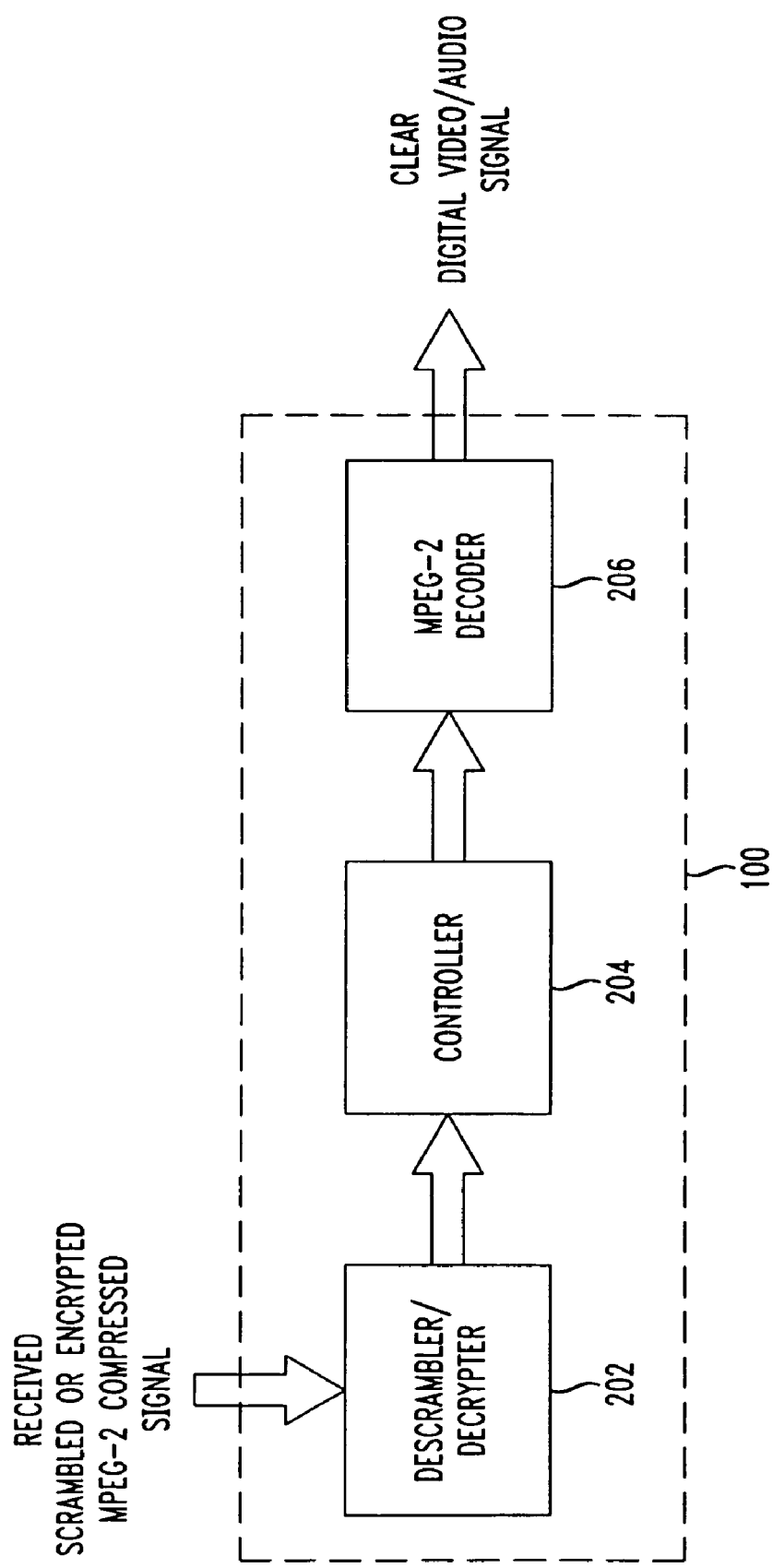
FIG. 2 is a more detailed block diagram of the subscriber's receiving equipment including a descrambler/decrypter, in accordance with the principles of the present invention.

FIG. 2 is a more detailed block diagram of the subscriber's receiving equipment 100 including a descrambler/decrypter 202, in accordance with the principles of the present invention.

In particular, in FIG. 2, the broadcast scrambled/encrypted MPEG-2 digital video and/or audio signal is descrambled by a descrambler/decrypter 202, and decoded by an appropriate digital compression decoder 206 (e.g., an MPEG-2 decoder), and output as a clear digital video and/or audio signal for use by the user. For instance, the clear digital video and/or audio signal may be provided to a television set or stereo receiver for viewing/listening by the user.

The subscriber's receiving equipment 100 further includes a controller 204, which generally controls the operations of the subscriber's receiving equipment 100. The controller 204 may be, e.g., a microprocessor, a microcontroller, or a digital signal processor (DSP). In the disclosed embodiment, the controller coordinates the descrambling/decrypting of the received scrambled MPEG-2 compressed digital video/audio signal, as well as the decoding of the unscrambled but still compressed video and/or audio signal.

While the descrambler 202 and MPEG-2 decoder 206 are shown separate from the controller 204 in FIG. 2, the descrambler 202 and/or the MPEG-2 decoder 206 may be integrated within the program memory of the controller 204 within the principles of the present invention.

The descrambler/decrypter 202 (and corresponding scrambler/encrypter at a broadcasting location) utilize a digital scrambling technique which leaves a header portion of all transport data packets unaffected, and also maintains the specified length of the transport data packets (e.g., at 188 bytes in accordance with MPEG-2 standards).

In particular, in accordance with the principles of the present invention, the descrambler 202 descrambles either (1) by descrambling or decrypting the data payload of selective transport payload packets (e.g., every nth packet); (2) by descrambling or decrypting only a portion (e.g., a central portion) of the data payload of every transport payload packets; or (3) by both descrambling or decrypting the data payload of every nth packet and descrambling or decrypting only a portion of the data payload of every transport payload packet. A corresponding scrambler within the headend equipment performs the complementary scrambling or encryption process.

(1) Scramble/Encrypt One Transport Packet Payload in Every n Packets

In accordance with this digital packetized signal scrambling/encryption technique capable of providing conditional access to a compressed digital signal scrambles the data payload portion of every nth transport packet, n being an integer greater than 1.

Figure 3:
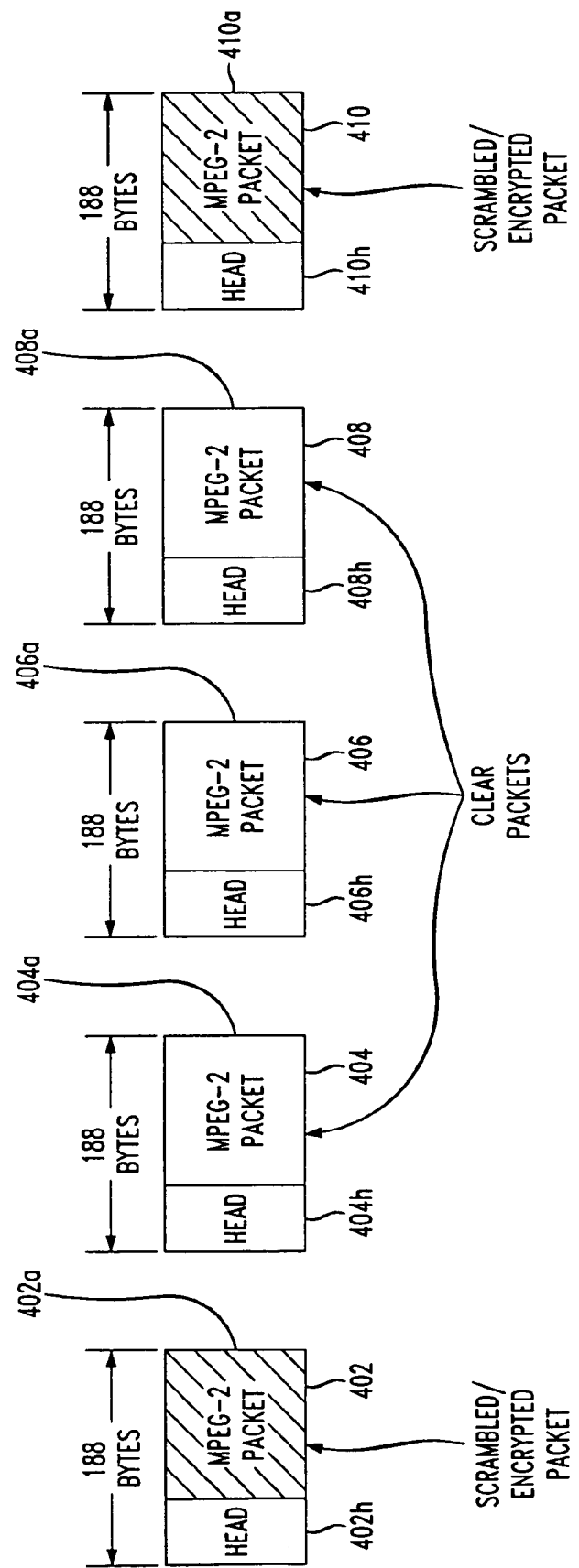
FIG. 3 shows a series of transport packets (e.g., five transport packets) of a digital, packetized bit stream (e.g., MPEG-2 bitstream), in accordance with the principles of the present invention.

FIG. 3 shows a series of transport packets (e.g., five transport packets) of a digital, packetized bit stream (e.g., MPEG-2 bitstream).

In particular, in FIG. 3, a digital bitstream 402-410 corresponding to an underlying video and/or audio signal is scrambled by scrambling the data payload portions 402a, 410a of every nth (e.g., every 4$^{th}$ as shown in FIG. 3) transport packet 402, 410.

Preferably, the particular transport packets 402, 410 chosen (and therefore the value of n) is selected to cause a sufficient amount of damage or scrambling to the received image and/or audio to cause the received signal to be unwatchable or unlistenable to non-subscribers. However, subscribers, having advance knowledge of the particular transport packets 402, 406 and the portion of the data payload 402a, 410a which is scrambled, can adequately reverse or descramble the scrambling, and therefore properly recover the data payload of all transport packets.

As an example of the selection of the value of n, an embodiment will be described with reference to a compressed, packetized digital bitstream used for video broadcast signals. In particular, in a DVB or GA high definition television (HDTV) system, the frame order of the picture in the coded bitstream is the order in which the decoder processes the frames. The original or reconstructed frames are not necessarily in the correct order for display. At the source encoder input and the decoder output, the frame order is:

| 1 | 2 | 3 | 4 | 5 | 6 | 7 | 8 | 9 | 10 | 11 | 12 | 13 |
|---|---|---|---|---|---|---|---|---|----|----|----|----|
| I | B | B | P | B | B | P | B | B | I  | B  | B  | P  |

At the encoder output, in the coded bitstream, and at the decoder input, the frame order is:

| 1 | 4 | 2 | 3 | 7 | 5 | 6 | 10 | 8 | 9 | 13 | 11 | 12 |
|---|---|---|---|---|---|---|----|---|---|----|----|----|
| I | P | B | B | P | B | B | I  | B | B | P  | B  | B  |

Picture '1I' is used to form a prediction for picture '4P'. Picture '4P' and '1I' are both used to form predictions for pictures '2B' and '3B'. The 'I' frame is the base of the 'P' and 'B' frames.

In accordance with the principles of the present invention, sufficient scrambling will be accomplished by scrambling every other I frame. Sufficient scrambling is accomplished because proper decoding requires two I frame detect mechanisms.

Thus, by scrambling or encrypting one transport packet in every n packets (e.g., one I frame in every 12 transport packets), the picture information base, that is I and P frame, will both be 'damaged' to provide a scrambled signal. Therefore, an unauthorized decoder will be unable to decode the underlying HDTV video image picture even if the remaining n−1 frames (e.g., the remaining 11 frames) are in clear!

(2) Partially Scramble/Encrypt Data Payload of Every (or Every Nth) Transport Packet:

Another scrambling/encryption technique suitable for use in scrambling digital packetized data (especially compressed image and/or audio data) in accordance with the principles of the present invention partially scrambles the data payloads of all received data transport packets. Although the principles relate to the scrambling of the entire contents of all data payloads, such excess scrambling may cause the need for a significant amount of processing to receive the digital signal, counteracting reasons for using a compressed digital signal in the first place. Thus, it is preferred that only a portion of each data payload be scrambled, e.g., a portion including a central portion of a data packet.

Figure 4:
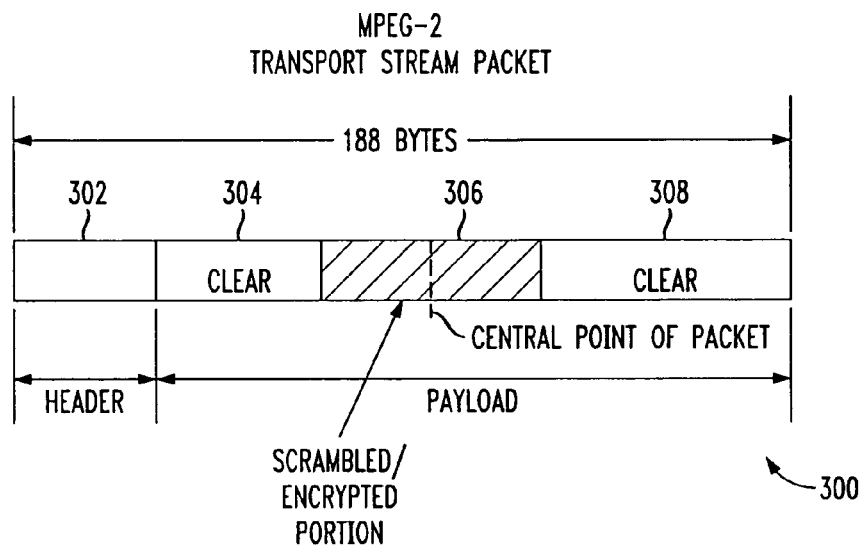
FIG. 4 shows a partially scrambled or encrypted data payload portion inside a data payload portion of a data transport packet, in accordance with the principles of the present invention.
Figure 5:
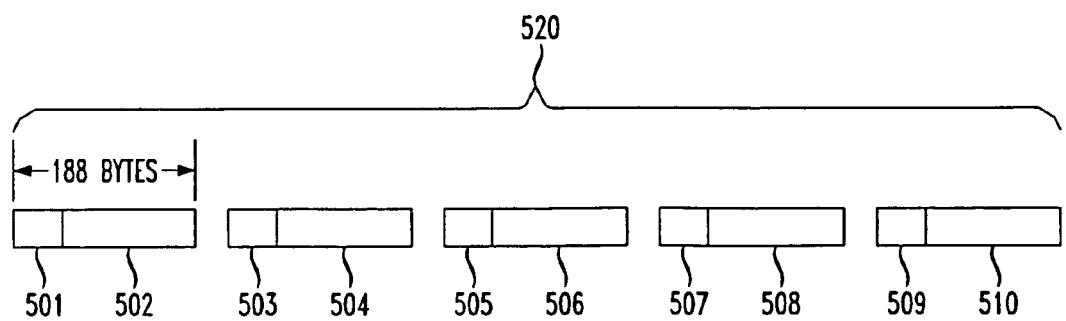
FIG. 5 shows a digital stream of MPEG-2 transport packets.

FIG. 4 shows a partially scrambled or encrypted data payload portion 306 inside a data payload portion 320 of a data transport packet 300. For explanation purposes, FIG. 4 is shown to have a length corresponding to MPEG-2. However, the principles of the present invention relate to the scrambling of any digital standard transported in packets over a conditional access system.

In particular, in FIG. 4, only a portion 306 of a data payload portion 320 of each transport packet 300 is scrambled or encrypted using any suitable technique (e.g., invert all bits, reverse order of bits, etc.), leaving the header 302 of the transport packet 300 clear and unaffected. In the preferred embodiment, a significant portion 304, 308 of the data payload portion 320 is left clear and unscrambled. Moreover, in the preferred embodiment, the scrambled portion 306 includes a central point of the data payload portion 320.

Both the scrambler and the descrambler are coordinated with respect to which transport packets are scrambled and/or as to which portion of a given transport packet is scrambled. This information may be fixed for a given subscriber, for a given channel, or for a given conditional access system. Alternatively, the particular portions being scrambled (and the particular scrambling technique used) may be passed to subscribers either in the header portion 302 of scrambled transport packets, and/or as separate control information.

How and why the partial scrambling of a data payload works to suitably scramble a digital signal is explained with reference to an MPEG-2 bitstream.

In particular, using an MPEG-2 bitstream transport packet as an example as shown in FIG. 4, the underlying video/audio signal carried in the data payload portion 320 is in compressed form. The structure of the underlying compressed video signal in compliance with the relevant MPEG-2 standards is generally divided into 6 levels, from the top to the bottom described as:

Sequence
Group of Pictures
Pictures
Slices
Macroblocks
Blocks

The lowest level of the elementary stream synchronization is the slice. There is no error correcting for the video compressed data stream in the source coding. Therefore, when the MPEG-2 decoder 206 decodes the underlying video stream, it will discard the entire slice in which unrecoverable errors occur or if the decoder 206 can't find the slice_start_code in the slice structure.

If only a few slices are discarded, an image with satisfactory quality can still be recovered, or at least the degradation or 'damage' to the image may be unperceivable by the user because the decoder 206 can replace the discarded slices with an adjacent slice. The slice replacement may be fine, especially when the image contains little movement from one frame to the next. Even if there is a large amount of movement, the effect of just a few slice replacements will be discounted by the viewer. Thus, when only a few slices are scrambled, adequate scrambling making the signal unusable by non-subscribers may not be accomplished.

However, if many slices are caused to be discarded by scrambling (e.g., half of all the slices in a picture (or in the group of picture, sequence)), the resulting picture will be unwatchable. In this case, adequate scrambling will have been accomplished.

In accordance with the principles of the present invention, the 2_bits_transport_scrambling_control flag in the transport packet link header 302 is set to '10' or '11'. In that transport packet 300, only part 306 of the data payload 320 is scrambled.

The scrambled portion 306 is preferably centered in the data packet, but may be at any portion of the data payload 320 within the principles of the present invention. Moreover, the scrambled portion 306 may be at a fixed location within each transport data packet, or may move in location from transport data packet to transport data packet.

For instance, selecting a central point in the data payload, the scramble location can shift +/− n bytes from that central point. Of course, it is preferred that the shift information be coordinated between scrambler and descramblers.

While the length of the scrambled portion 306 may change, it is preferred that the length of the scrambled portion 306 remain fixed, even when shifting location from data packet to data packet. Moreover, the length of the scrambled portion should be selected based on the desired amount of scrambling of the received signal, keeping in mind that the larger the length of the scrambled portion 306, the greater the need for descrambling operation memory. Thus, there is a design balance to be struck as between an amount of damage caused to a scrambled digital packetized signal, and an acceptable amount of descrambling overhead to be incurred.

Selection of a central point in the transport packet 300 is intended to allow blind placement of a scrambled portion within the data payload without the need to process header and/or data payload information. Thus, it is presumed that the central point in the transport packet 300 is well within the data payload portion 320.

The scrambled portion 306 of the data transport packet 300 may be scrambled using any suitable technique applicable to data, e.g., inverse, cut point rotation, etc., or encrypted by a certain block or series encryption algorithm like DES. A suitable simple technique is to invert the data in the scrambled portion 306. Using a suitable scrambling technique, the data contained in the relevant slice of the picture or the slice_start_code will be destroyed, and an ordinary decoder which has not been authorized by the broadcaster (i.e., a non-subscriber) will discard such slices. As a result, the unauthorized viewer will be unable to enjoy the program that they haven't paid for. On the other hand, all authorized receivers 100 including a suitable descrambler/decrypter 202 will have knowledge of the appropriate transport packets and/or particular scrambled portions of the transport packets such that the program slice structure can be corrected to a normal state, allowing the subsequent MPEG-2 decoder 206 to decode the video/audio bitstream normally without discarded slices.

The new scramble techniques and apparatus in accordance with the principles of the present invention maintain the advantages of the user of a compressed digital signal, e.g., MPEG-2 digital compressed signal characteristics, within the relevant requirements for standard digital transmissions and without the need for substantial additional system resources. For instance, scrambling of data payloads of transport packets in a conditional system in accordance with the principles of the present invention requires less RAM and lower decryption system operational speeds as compared to otherwise conventional techniques. Moreover, because of the lowered operational speeds required, a more sophisticated encryption algorithm may be performed. The new scrambling technique is difficult to hack, attracting potential customers and increasing the appeal of the scrambling technique.

In accordance with the principles of the present invention, at best only part of an underlying video image (or audio signal) can be properly received by non-subscribers to a conditional access system, providing adequate scrambling to those non-subscribers.

While the invention has been described with reference to the exemplary embodiments thereof, those skilled in the art will be able to make various modifications to the described embodiments of the invention without departing from the true spirit and scope of the invention.

What is claimed is:

1. A method of scrambling a data stream, comprising:
   encoding a plurality of video frames to generate a compressed bitstream;
   generating a stream of transport packets to transport the compressed bitstream, wherein each transport packet has a fixed length and comprises (i) a header and (ii) a payload having data from the compressed bitstream;
   selecting every n-th transport packet in said stream of transport packets for scrambling processing, where n is a positive integer;
   in each selected transport packet, scrambling a first portion of the payload while leaving at least a second portion of the payload unscrambled to generate a corresponding scrambled transport packet; and
   transmitting a stream of transport packets having the generated scrambled transport packets from a transmitter of a conditional access system.

2. The method of claim 1, further comprising leaving at least some non-selected transport packets in said stream of transport packets unscrambled.

3. The method of claim 1, wherein the step of selecting comprises selecting every transport packet in said stream of transport packets.

4. The method of claim 1, wherein n is an integer greater than one.

5. The method of claim 4, further comprising scrambling the entire payload in at least some non-selected transport packets of said stream of transport packets.

6. The method of claim 1, wherein, in all selected packets, the first portion is at a fixed location within the transport packet.

7. The method of claim 1, wherein the first portion includes a center point of the corresponding transport packet.

8. The method of claim 1, wherein, in at least two of the selected packets, the respective first portions have different locations within the respective payloads.

9. The method of claim 8, further comprising changing locations of the first portions within payloads of the selected transport packets in coordination with a descrambler.

10. The method of claim 1, wherein, in at least two of the selected packets, the respective first portions have different lengths.

11. The method of claim 1, wherein, in at least some of the selected packets, the first portion is surrounded on both sides by the second portion.

12. The method of claim 1, wherein the step of scrambling comprises inverting data within the first portion.

13. The method of claim 1, wherein the compressed bitstream is an MPEG data stream.

14. The method of claim 1, wherein the compressed bitstream includes an audio signal.

15. Apparatus for scrambling a data stream, comprising:
    means for encoding a plurality of video frames to generate a compressed bitstream;

means for generating a stream of transport packets to transport the compressed bitstream, wherein each transport packet has a fixed length and comprises (i) a header and (ii) a payload having data from the compressed bitstream;

means for selecting every n-th transport packet in said stream of transport packets for scrambling processing, where n is a positive integer; and means for scrambling a first portion of the payload in each selected transport packet while leaving at least a second portion of the payload unscrambled.

16. A descrambling method, comprising:

receiving, at a receiver of a conditional access system, a stream of transport packets that transports a compressed bitstream, wherein:

each transport packet has a fixed length and comprises (i) a header and (ii) a payload having data from the compressed bitstream; and the compressed bitstream encodes a plurality of video frames;

selecting every n-th transport packet in said stream of transport packets for descrambling processing, where n is a positive integer;

in each selected transport packet, descrambling a first portion of the payload while not subjecting at least a second portion of the payload to descrambling; and reconstructing the compressed bitstream using the descrambled first portions of the selected transport packets.

17. The method of claim 16, wherein the step of selecting comprises selecting every transport packet in said stream of transport packets.

18. The method of claim 16, wherein n is an integer greater than one.

19. The method of claim 16, wherein, in all selected packets, the first portion is at a fixed location within the transport packet.

20. The method of claim 16, wherein the first portion includes a center point of the corresponding transport packet.

21. The method of claim 16, wherein, in at least two of the selected packets, the respective first portions have different locations within the respective payloads.

22. The method of claim 16, wherein, in at least two of the selected packets, the respective first portions have different lengths.

23. The method of claim 16, wherein, in at least some of the selected packets, the first portion is surrounded on both sides by the second portion.

24. The method of claim 16, wherein the step of descrambling comprises inverting data within the first portion.

25. The method of claim 16, wherein the compressed bitstream is an MPEG data stream.

26. The method of claim 16, wherein the compressed bitstream includes an audio signal.

27. A receiver, comprising:

means for receiving a stream of transport packets that transports a compressed bitstream, wherein:

each transport packet has a fixed length and comprises (i) a header and (ii) a payload having data from the compressed bitstream; and the compressed bitstream encodes a plurality of video frames;

means for selecting every n-th transport packet in said stream of transport packets for descrambling processing, where n is a positive integer;

means for descrambling a first portion of the payload in each selected transport packet and not subjecting at least a second portion of the payload to descrambling; and means for reconstructing the compressed bitstream using the descrambled first portions of the selected transport packets.

* * * * *